United States Patent [19]

Humphrey

[11] 4,120,749

[45] Oct. 17, 1978

[54] METHOD OF MAKING FIBER-REINFORCED PLASTIC UNITIZED BOAT HULL FRAME

[76] Inventor: Richard V. Humphrey, 10 Loring Ave., Kingston, Mass. 02364

[21] Appl. No.: 740,653

[22] Filed: Nov. 10, 1976

Related U.S. Application Data

[62] Division of Ser. No. 599,848, Jul. 28, 1975, abandoned.

[51] Int. Cl.² .......................... B29D 9/00; B63B 5/24
[52] U.S. Cl. ...................................... 156/245; 9/6 P
[58] Field of Search ................ 156/242, 245, 296; 9/6 R, 6 P, 6 W, 6.5; 114/65 R; 264/257, 258; 249/60

[56] References Cited

U.S. PATENT DOCUMENTS

| | | | |
|---|---|---|---|
| 2,909,790 | 10/1959 | Wagemaker | 9/6 W |
| 3,007,208 | 11/1961 | Urban | 9/6 P |
| 3,080,267 | 3/1963 | Schmalz | 9/6 P |
| 3,093,847 | 6/1963 | Strecker | 9/6 P |
| 3,344,007 | 9/1967 | Skoggard | 9/6 P |
| 3,775,214 | 11/1973 | Winters | 156/245 |

FOREIGN PATENT DOCUMENTS 787,260 12/1957 United Kingdom ........................ 9/6 P

*Primary Examiner*—Caleb Weston
*Attorney, Agent, or Firm*—John M. Brandt

[57] ABSTRACT

A unitized fiber-reinforced plastic boat hull frame is disclosed in which the structural members, most commonly a keel and ribs, comprising the frame are constructed of fiber-reinforced plastic formed within a mold corresponding to the shapes of the various members. The members are attached to one another by either contacting them together prior to the completion of curing to produce a plastic bond, or with appropriate adhesives after curing. Planking comprised of any suitable material, wood for example, is added to complete the hull.

10 Claims, 6 Drawing Figures

METHOD OF MAKING FIBER-REINFORCED PLASTIC UNITIZED BOAT HULL FRAME

This is a division of application Ser. No. 599,848, filed July 28, 1975, abandoned

BACKGROUND OF THE INVENTION

1. Field of the Invention

The invention relates to boat hulls and boat hull frames and more particularly to a unitized frame comprised of fiber-reinforced plastic and a method for manufacturing the same.

2. Description of the Prior Art

The prior art is replete with designs and techniques for constructing boat hulls and boat hull frames of moderate size. Included in the art is the ancient and well-known craft of building frames consisting of a keel and rib members of wood and the planking over the assembled frame to complete the hull. Also known in the art is the technique of casting an entire hull of fiber-reinforced plastic or fiberglass, as it is often referred to.

Several patents are illustrative of techniques combining both wood and synthetics or plastics. For example, U.S. Pat. No. 2,758,321 discloses a hull structure which is fundamentally a plastic shell layed up over wood-reinforcing ribs. U.S. Pat. No. 2,569,224 reveals a technique utilizing a thin layer of sheet plastic between two layers of wood planking. U.S. Pat. No. 2,743.465 discloses a hull comprising an exterior and interior layer of plastic layed over wood planks. U.S. Pat. No. 3,139,371 describes a material comprised of plastic-impregnated nylon mesh forming inner and outer layers over a balsa wood core which may be easily molded into boat hull configurations. As will be described below, the present invention involves an approach heretofore unknown to the inventor employing the reverse of the general technique of plastic over wood illustrated above.

SUMMARY OF THE INVENTION

The invention may be summarized as a unitized boat hull frame comprised of fiber-reinforced plastic and a method for constructing such frames. Conventional planking may be added to complete the hull.

The advantages of the concept over wood frames are many and include:

The ability to form a frame having built-in structural reinforcement that can be stronger or stiffer as stresses demand without adding or cutting away quantities of material as is necessary when using wood;

The ability to reproduce any hull shape by making a mold of an existing boat or by traditional lofting methods;

The lack of need to produce a finely finished mold as is usually required in fiberglass hull moldings;

The ability to transport the frame in disassembled condition for construction of a complete hull at a separate location from the place of manufacture; and The ability to mold fairing tapers into all structural members.

All of the above is accomplished by the technique of molding the frame members to shape by laying uncured fiber-reinforced plastic material of appropriate size and composition into mold portions corresponding to hull frame members, in particular into special channel molds for each member to be constructed. The members may be bonded either by allowing them to cure on contact to form a plastic bond or by adhesives after curing.

The resulting frame is simple and inexpensive to manufacture, strong, lightweight, impervious to rot and deterioration, easily bonded by adhesives rather than nails, screws, or bolts, and highly accurate and faithful to the original boat design. The technique is appropriate for all manner of moderate size boats which might be constructed by the plank and frame method. The invention will be more particularly detailed in the drawings and description of the preferred embodiment which follow.

DESCRIPTION OF THE PREFERRED EMBODIMENT

Figure 1:
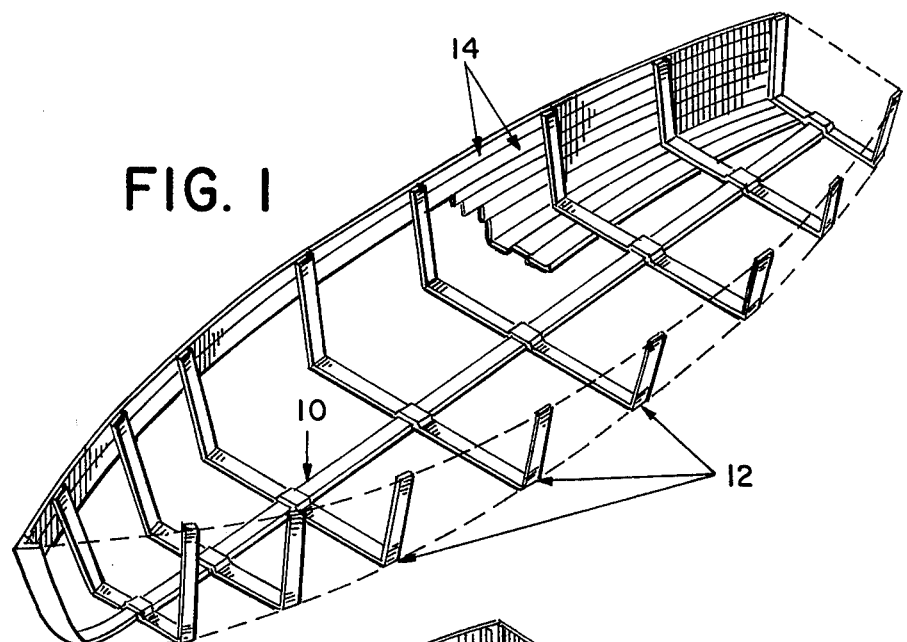
FIG. 1 is a perspective view of the preferred embodiment of the invention.

Referring to FIG. 1, there is shown in perspective view a boat hull frame, partially planked, comprised of fiber-reinforced plastic. The frame is constructed of a longitudinal or keel member 10 and a plurality of transverse or rib members 12. They are attached either by allowing the members to cure in contact to form a plastic or self bond or by preventing such contact during the curing process and later bonding the cured members with an adhesive such as epoxy. In the embodiment illustrated, the rib members overlap the keel member, but the positions may be reversed. In either case, precise positioning for bonding after curing is assured by the interlocking nature of the design and optionally, alignment indicators such as marks, small holes, or impressions which may be added during the molding process.

Other structural members may be added according to the stress demands which will be placed on the frame. The include additional stringers or longitudinal supports, seat supports, and in general all structural elements common to boat hull design.

The frame, when assembled, can be planked with any suitable material, preferrably thin strips of wood 14 which bend easily to the configuration of the hull. The wood may be attached by adhesives, such as epoxy, eliminating the need for nails or screws which deteriorate through electrolysis.

Figure 3:
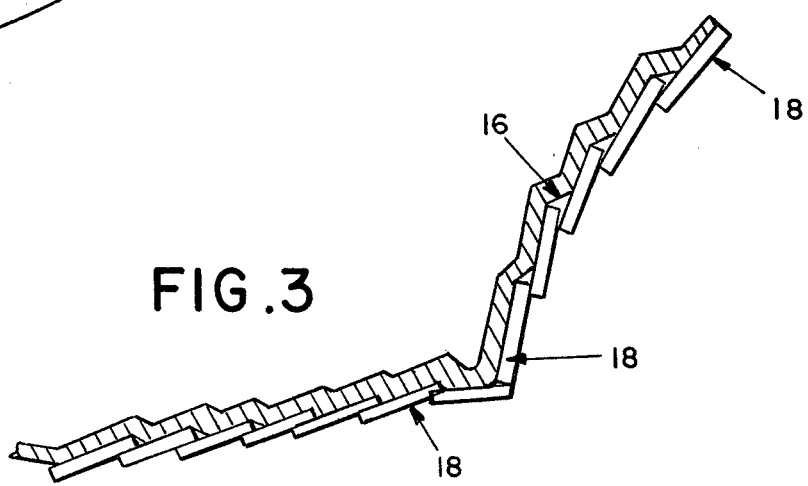
FIG. 3 is a cross-sectional view of an alternative configuration of a structural member of the invention.

FIG. 3 is a cross-sectional representation of an alternative shape for rib members. The fiber-reinforced plastic 16 is molded in a step configuration to produce a finished hull of lap-strake construction when planks 18 are layed over and affixed to the ribs in the manner described above. Step molding provides the additional advantage of acting as a fix or locator for each plank simplifying the overall construction.

Figure 2:
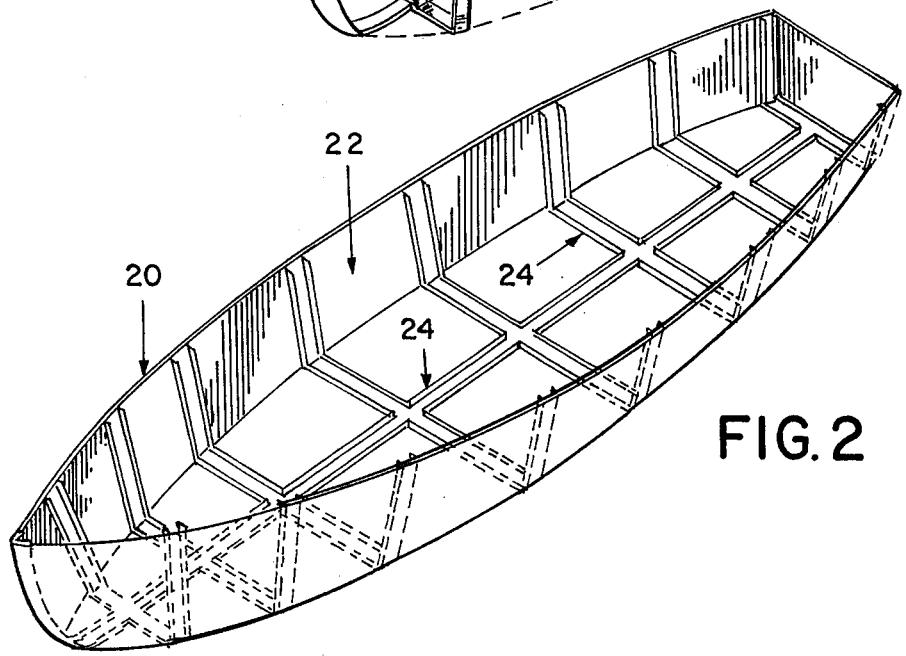
FIG. 2 is a perspective view of a mold apparatus used to form the embodiment of FIG. 1.

Referring next to FIG. 2, mold apparatus used in the method of constructing the above described frame is illustrated. The hull to be reproduced may be a complete boat hull, for example a classic shape such as a cat boat or friendship sloop available as a complete boat in drydock, or a design which is built up for the purpose. The model or original hull, not shown, becomes the plug over which a support mold 20 is formed, typically of a fiberglass material. The interior 22 of the support mold thus exactly reproduces the shape of the exterior of the original hull to be reproduced. However, the interior of the support mold need not be finely finished as is the case when producing molds for conventional fiberglass shell boat hulls.

Channels 24 for the specific structural members are attached to the interior of the support mold by adhesives or counter-sunk nuts and bolts or other means as would be appropriate. The channels are placed wherever a longitudinal or transverse structural member is desired and are constructed of any suitable material, preferably a flexible plastic which will conform and bend to the shape of the support mold, one which is not degraded by polyester or plastic resins, nor one to which these resins will bind. Plastics appropriate for the purpose include polyethylene, polypropylene, and polyvinyl chloride. These ae commonly available in standard extuded profiles and can be used with little or no modification.

The number, size and spacing of the channels may be varied at will to provide structural reinforcement wherever desired.

Once the support mold and frame member channel molds are combined into an assembly, strips of uncured fiber-reinforced plastic are layed in the channels and allowed to cure. Where a self bond is desired, the uncured members are allowed to contact one another. Where no bond is desired and it is intended that the members be attached after removal from the mold, a thin membrane of plastic abhorent material such as polyethylene or polyvinyl alcohol is inserted between the strips. Such a practice allows the frame to be shipped in kit form to be assembled at the destination. As mentioned, the channels themselves are plastic abhorent or are covered with such a material.

A number of plastics or more precisely resin-catalyst promoter systems may be used in combination with glass, nylon, carbon or polypropylene fibers to mold the frames. These include polyester and epoxy resins. For normal gel times of approximately an hour, cobalt promoted methyl ethyl ketone peroxide catalyzed resins may be used. Where a short gel time is desired for quick-setting structural fillers, benzoyl peroxide catalyst may be used. For long gel times, an unpromoted resin catalyst system can be employed, requiring in addition the application of heat to produce curing. Other combinations of material fitting into the fiber-reinfoced plastic category may be employed, as would be obvious to those skilled in the art.

In constructing any particular hull frame configuration, care must be taken not to mold the frames such that the cured assembly locks up in the support mold. This is accomplished, when necessitated by the frame design, by making some or all of the frame members removable from the frame after molding; that is, by preventing self of plastic bonds by inserting contact preventing membranes as described above. Also a multipiece or sectional support mold duplicating separate portions of the hull can be used, assembling such sections to form a complete mold and disassembling them to free the frame.

Figure 4:
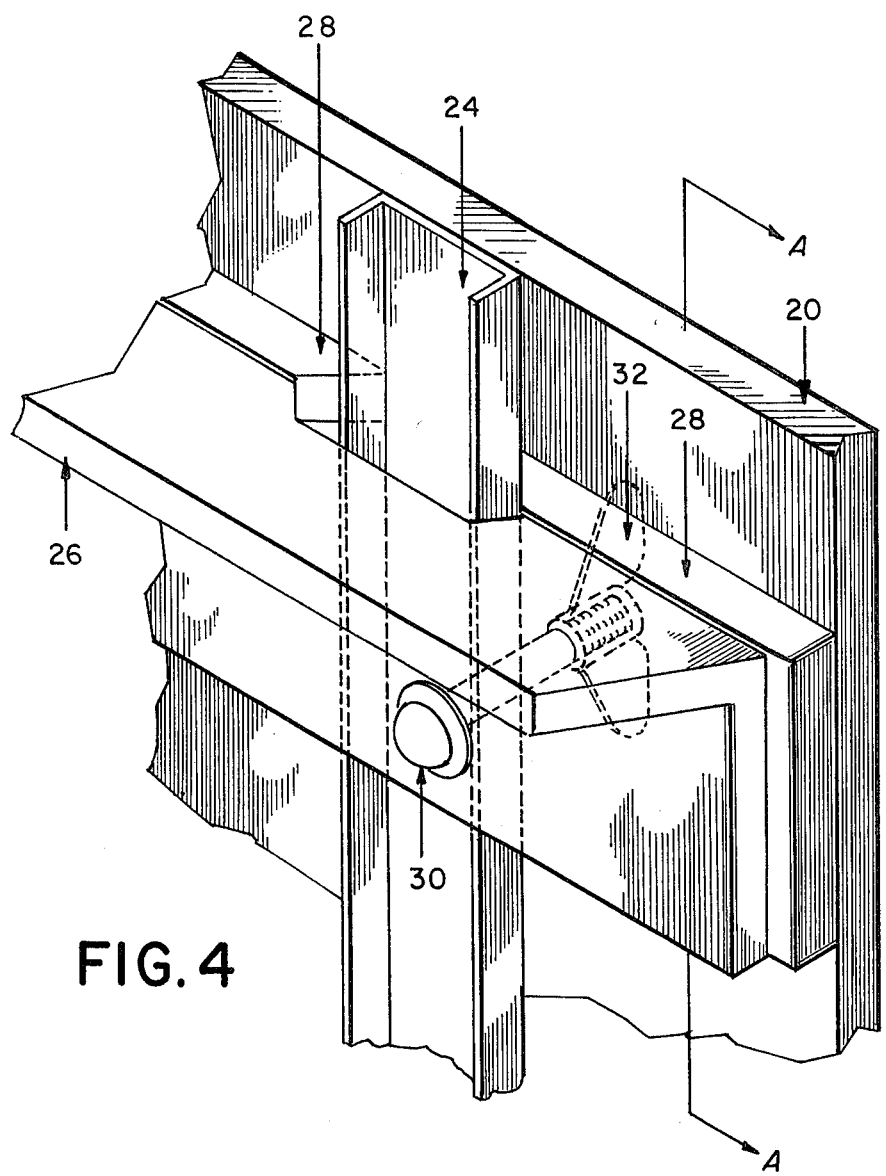
FIG. 4 is a perspective view of additional mold apparatus.
Figure 5:
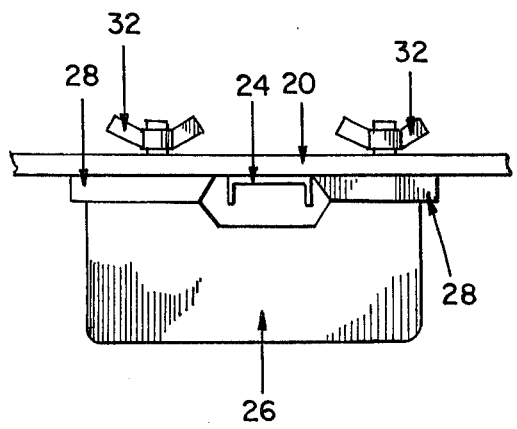
FIG. 5 is a top view of FIG. 4.
Figure 6:
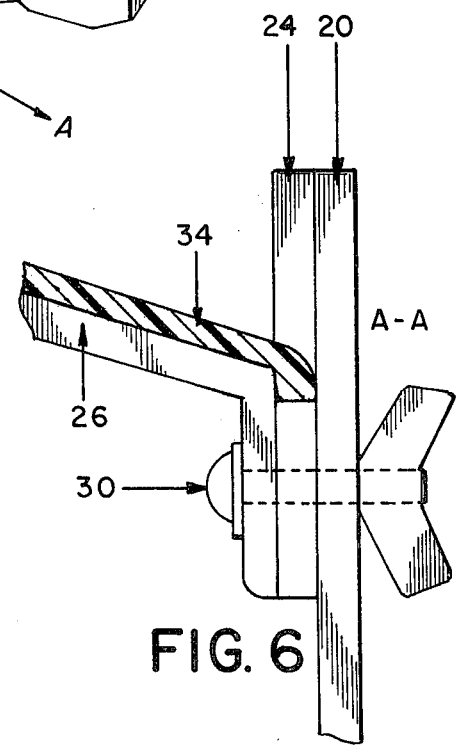
FIG. 6 is a side cross-sectional view of FIG. 4 along line A—A.

An additional technique which may be used to add structural members and prevent lock up is illustrated by the apparatus of FIGS. 4, 5, and 6. Shown in perspective view is a demountable support assembly which may be used to add additional structure to the frame, a seat or deck support for example. Support mold 20, employing like members from previous figures for clarity, serves to shape and contain mold channel 24. Removable support block 26 is held up against removable spacer blocks 28 by bolts 30 and wing nuts 32. Blocks 26 and 28 are comprised of or covered with a plastic abhorent material in the manner previously described. A strip of uncured fiber-reinforced plastic 34 may now be placed along block 26 in contact with an additional transverse strip in channel 24 to form the desired component. After curing, the blocks are removed to free the frame components from the mold. As before, depending upon the hull design, additional structural members may be cured together in contact or prevented from contact and later bonded by adhesives.

As will be obvious, the concept of the invention encompasses an extensive range of frame configurations and fiber-reinforced plastic materials to produce a unitized frame of the type described above. Accordingly, the scope of the invention is defined by the following claims.

What is claimed is:

1. The method of constructing a fiber-reinforced plastic unitized frame for a boat hull, said frame comprising at least one longitudinal frame member and a plurality of transverse frame members, said method comprising the steps of:
    a. forming a support mold of the exterior surface of said hull, said support mold having a plurality of plastic abhorent frame member portions corresponding to the shape and location of said longitudinal and said transverse frame members;
    b. placing a longitudinal strip of fiber-reinforced plastic in an uncured state over each of said protions of the mold corresponding to a longitudinal frame member;
    c. placing additional transverse strips of fiber-reinforced plastic in the uncured state over each of said portions of the mold corresponding to a transverse frame member wherein each of said transverse strips are in contact with at least one longitudinal strip; and
    d. curing said strips to form said unitized frame.

2. The method of claim 1 further including the steps of forming said support mold in a plurality of demountable sections and then assembling said sections to form a complete mold.

3. The method of claim 1 further including the step of attaching a plurality of plank members over and across said transverse members.

4. The method of claim 1 futher including the step of placing a plastic abhorent material between at least some of said transverse and said longitudinal strips to prevent a plastic bond.

5. The method of claim 4 further including the step of attaching said unbonded members with adhesive after curing.

6. The method of constructing a fiber-reinforced plastic unitized boat hull frame, said frame comprising at least one longitudinal frame member and a plurality of transverse frame members, said method comprising the steps of:
    a. forming a support mold of the exterior surface of said hull;
    b. attaching a plurality of plastic abhorent channels to the interior surface of said support mold, said channels having a shape corresponding to the shape of said longitudinal and said transverse frame members, said channels intersecting within said mold at points where said transverse and said longitudinal frame members are to be joined;

c. placing a longitudinal strip of fiber-reinforced plastic in an uncured state within each of said channels; and d. curing said strips to form said unitized frame.

7. The method of claim 6 further including the steps of forming said support mold in a plurality of demountable sections and then assembling said sections to form a complete mold.

8. The method of claim 6 further including the step of attaching a plurality of plank members over and across said transverse members.

9. The method of claim 6 futher including the step of placing a plastic abhorent material between at least some of said transverse and said longitudinal strips to prevent a plastic bond.

10. The method of claim 9 further including the step of attaching said unbonded members with adhesive after curing.